(12) United States Patent
Tanaka et al.

(10) Patent No.: US 10,027,194 B2
(45) Date of Patent: Jul. 17, 2018

(54) MOTOR ROTOR SUPPORT AND METHOD FOR MANUFACTURING SAME

(71) Applicants: THE JAPAN STEEL WORKS, LTD., Shinagawa-ku, Tokyo (JP); SANWAKOGYO Ltd., Noboribetsu-shi, Hokkaido (JP)

(72) Inventors: Shinji Tanaka, Muroran (JP); Hirokazu Madarame, Muroran (JP); Toshifumi Nakajima, Tokyo (JP); Kazuhiro Miyagi, Noboribetsu (JP)

(73) Assignees: THE JAPAN STEEL WORKS, LTD., Tokyo (JP); SANWAKOGYO Ltd., Noboribetsu-shi, Hokkaido (JP)

( * ) Notice: Subject to any disclaimer, the term of this patent is extended or adjusted under 35 U.S.C. 154(b) by 671 days.

(21) Appl. No.: 14/388,706

(22) PCT Filed: Mar. 27, 2013

(86) PCT No.: PCT/JP2013/059148
§ 371 (c)(1),
(2) Date: Sep. 26, 2014

(87) PCT Pub. No.: WO2013/146958
PCT Pub. Date: Oct. 3, 2013

(65) Prior Publication Data
US 2015/0054360 A1  Feb. 26, 2015

(30) Foreign Application Priority Data
Mar. 29, 2012 (JP) .................... 2012-077892

(51) Int. Cl.
*H02K 1/02* (2006.01)
*H02K 1/27* (2006.01)
(Continued)

(52) U.S. Cl.
CPC ............ *H02K 1/2793* (2013.01); *B21D 39/00* (2013.01); *C21D 6/002* (2013.01); *C21D 6/005* (2013.01);
(Continued)

(58) Field of Classification Search
CPC .......... B21D 53/00; B21D 39/00; H02K 1/02; H02K 1/182; H02K 15/03; C22C 38/58; C22C 38/38
(Continued)

(56) References Cited

U.S. PATENT DOCUMENTS 4,493,733 A * 1/1985 Yamamoto ............. C22C 38/38
                                                                148/327
5,643,530 A     7/1997 Shingu et al.
(Continued)

FOREIGN PATENT DOCUMENTS

CN      1276643 A    12/2000
EP      0280996 A2    9/1988
(Continued)

OTHER PUBLICATIONS

Japanese Patent Office, JP 2008-289314 A Machine Translation, Feb. 16, 2018, 4 pages.*
(Continued)

*Primary Examiner* — Jermie Cozart
(74) *Attorney, Agent, or Firm* — Sughrue Mion, PLLC

(57) ABSTRACT

An object of the present invention is to provide a motor rotor support suitable for an axial gap motor and a method for manufacturing the same. The motor rotor support for supporting a magnetic body disposed on a rotor of the motor is configured by laminating single materials each formed from a hot-worked material or a cold-worked material preferably composed of an 18Mn-18Cr nonmagnetic steel.

20 Claims, 8 Drawing Sheets

(51) Int. Cl.

| | | |
|---|---|---|
| *B21D 39/00* | (2006.01) | |
| *C22C 38/00* | (2006.01) | |
| *C22C 38/38* | (2006.01) | |
| *C21D 6/00* | (2006.01) | |
| *C21D 8/02* | (2006.01) | |
| *C21D 9/00* | (2006.01) | |
| *C22C 38/02* | (2006.01) | |
| *C22C 38/06* | (2006.01) | |
| *C22C 38/22* | (2006.01) | |
| *C22C 38/24* | (2006.01) | |
| *C22C 38/26* | (2006.01) | |
| *C22C 38/44* | (2006.01) | |
| *C22C 38/46* | (2006.01) | |
| *C22C 38/48* | (2006.01) | |
| *C22C 38/52* | (2006.01) | |
| *C22C 38/58* | (2006.01) | |
| *H02K 1/30* | (2006.01) | |
| *C21D 8/00* | (2006.01) | |
| *H02K 1/28* | (2006.01) | |
| *H02K 15/02* | (2006.01) | |
| *C22C 38/34* | (2006.01) | |
| *C22C 38/54* | (2006.01) | |
| *H02K 15/03* | (2006.01) | |

(52) U.S. Cl.
CPC ........... *C21D 8/005* (2013.01); *C21D 8/0226* (2013.01); *C21D 8/0263* (2013.01); *C21D 9/0068* (2013.01); *C22C 38/00* (2013.01); *C22C 38/001* (2013.01); *C22C 38/02* (2013.01); *C22C 38/06* (2013.01); *C22C 38/22* (2013.01); *C22C 38/24* (2013.01); *C22C 38/26* (2013.01); *C22C 38/34* (2013.01); *C22C 38/38* (2013.01); *C22C 38/44* (2013.01); *C22C 38/46* (2013.01); *C22C 38/48* (2013.01); *C22C 38/52* (2013.01); *C22C 38/54* (2013.01); *C22C 38/58* (2013.01); *H02K 1/02* (2013.01); *H02K 1/28* (2013.01); *H02K 1/30* (2013.01); *H02K 15/02* (2013.01); *C21D 8/0236* (2013.01); *C21D 2261/00* (2013.01); *H02K 15/03* (2013.01); *Y10T 156/1002* (2015.01)

(58) Field of Classification Search
USPC ........ 310/216.004, 91; 148/327; 420/56, 57, 420/59, 74
See application file for complete search history.

(56) References Cited

U.S. PATENT DOCUMENTS

| | | |
|---|---|---|
| 6,177,748 B1 | 1/2001 | Katcher et al. |
| 6,396,190 B1 | 5/2002 | Ahn et al. |
| 2008/0274007 A1* | 11/2008 | Ishikawa .............. C21D 9/0093 420/38 |
| 2010/0272593 A1 | 10/2010 | Ishikawa et al. |
| 2012/0104880 A1 | 5/2012 | Takemoto et al. |
| 2012/0262022 A1 | 10/2012 | Takemoto et al. |
| 2012/0326554 A1* | 12/2012 | Kinpara .................. H02K 1/16 310/216.004 |

FOREIGN PATENT DOCUMENTS

| | | |
|---|---|---|
| EP | 2248919 A1 | 11/2010 |
| EP | 2372871 A2 | 10/2011 |
| JP | 61-23750 A | 2/1986 |
| JP | 7-102318 A | 4/1995 |
| JP | 8-295998 A | 11/1996 |
| JP | 11-69680 A | 3/1999 |
| JP | 2008289314 A * | 11/2008 |
| JP | 2009-95089 A | 4/2009 |
| JP | 2011-6776 A | 1/2011 |
| JP | 2011-10375 A | 1/2011 |
| JP | 2011-55577 A | 3/2011 |
| WO | 2011/046108 A1 | 4/2011 |

OTHER PUBLICATIONS

Communication dated Oct. 7, 2015 issued by the Japanese Intellectual Property Office in counterpart Japanese Patent Application No. 2012-0077892.
Communication dated Oct. 22, 2015 issued by European Patent Office in counterpart European Patent Application No. 13769939.3.
International Search Report dated May 28, 2013 issued in International Application No. PCT/JP2013/059148 (PCT/ISA/210).
Written Opinion dated May 28, 2013 issued in International Application No. PCT/JP2013/059148 (PCT/IS/237).
Communication dated Jan. 5, 2017, from the State Intellectual Property Office of People's Republic of China in counterpart Application No. 201380018031.3.

* cited by examiner

MOTOR ROTOR SUPPORT AND METHOD FOR MANUFACTURING SAME

TECHNICAL FIELD

The present invention relates to a support for supporting a magnetic body used for a motor rotor and disposed on the rotor.

BACKGROUND ART

Usually, for the purpose of exhibiting high performance, a rare-earth magnet to which a rare earth such as neodymium or dysprosium is added has been used as a magnet for a motor.

PTL 1 discloses an axial type motor having a rotor fitted with plural permanent magnets having magnetic poles in a parallel direction to a rotary shaft.

Moreover, PTL 2 proposes a high-performance axial gap motor having a ferrite magnet instead of the rare-earth magnet.

The axial type motor or axial gap motor has a rotor on which a magnet is disposed and the magnet is supported by a support included in the rotor. As the support, there is generally used a nonmagnetic steel composed of an austenite stainless steel.

The support is included in the rotor that rotates at a high speed, and it is necessary for the support to support the magnet to keep its position appropriately. Therefore, it is necessary for the support to have not only a nonmagnetic property but also an appropriate strength.

Incidentally, the austenite stainless steel exhibits increased strength through cold working, but there is a problem that the nonmagnetic property is impaired by strain induced transformation. Therefore, there is usually adopted a step of subjecting a raw material after hot forging to machining to obtain a support shape.

CITATION LIST

Patent Literature

PTL 1: WO2011/046108
PTL 2: JP-A-2011-010375

SUMMARY OF INVENTION

Technical Problem

However, in recent years, there is a demand for increase in speed and size of a motor and hence required strength for the support has been enhanced. Also, there is a demand for weight saving even in the case where the increase in size is not necessary, so that it is desired to achieve high strength that corresponds to the weight saving. However, as described above, in the related-art material, the nonmagnetic property and the high strength are in the relation of trade-off and hence the material cannot satisfy the above demands. In addition, in the case of a relatively thick support, there is also a problem that a work rate is small and necessary strength is difficult to obtain.

Moreover, in the related-art manufacturing steps, in order to obtain a product shape that is a complex shape, it is necessary to process a hot forged raw material through mechanical cutting, wire cutting, and the like for a considerable period of time. Although the period depends on the product shape and size, there is a case where the processing requires such a period of time as 2 weeks. Therefore, when mass production is considered, the above circumstances become very serious problems. However, since there is a limitation on manufacturing steps as described above, there is a problem that it is impossible to adopt steps in which productivity is considered.

The present invention is devised on the background of the above situation and an object thereof is to provide a motor rotor support capable of increasing strength with maintaining the nonmagnetic property and further having less limitation on manufacturing steps and a method for manufacturing the same.

Solution to Problem

Therefore, according to a first illustrative aspect of the invention, there is provided a motor rotor support for supporting a magnetic body disposed on a rotor of a motor, wherein the support is obtained by laminating single materials each of which is formed from a hot-worked material or a cold-worked material obtained from a nonmagnetic steel and has a relative permeability of less than 1.005 and a 0.2% yield strength at room temperature of 550 MPa or more.

According to a second illustrative aspect of the invention, in the rotor motor support, the single material is a cold-worked material and has a relative permeability of less than 1.005 and a 0.2% yield strength at room temperature of 600 MPa or more.

According to a third illustrative aspect of the invention, in the rotor motor support, the nonmagnetic steel is an 18Mn-18Cr nonmagnetic steel.

According to a fourth illustrative aspect of the invention, in the rotor motor support, a rare-earth magnet or a non-rare-earth magnet is included as the magnetic body.

According to a fifth illustrative aspect of the invention, in the rotor motor support, the non-rare-earth magnet is a ferrite magnet.

According to a sixth illustrative aspect of the invention, in the rotor motor support, a dust core is included as the magnetic body.

According to a seventh illustrative aspect of the invention, the rotor motor support has a lamination structure in which the single materials are bound.

According to an eighth illustrative aspect of the invention, in the rotor motor support, the binding is any one of caulking, screwing, welding, adhering, and outer periphery shrink-fitting with a ring material or a combination thereof.

According to a ninth illustrative aspect of the invention, there is provided a method for manufacturing a motor rotor support for supporting a magnetic body disposed on a rotor of a motor, the method comprising: subjecting a nonmagnetic steel to hot working to obtain a hot-worked material; subjecting the hot-worked material to machining to obtain a support single material having a relative permeability of less than 1.005 and a 0.2% yield strength at room temperature of 550 MPa or more; and laminating and binding the support single materials.

According to a tenth illustrative aspect of the invention, in the method for manufacturing a motor rotor support, after the hot working, a solid solution treatment at 1,000° C. or more for 5 minutes or more is performed, and thereafter an aging treatment at 600 to 1,000° C. for 0.5 hours or more is performed.

According to an eleventh illustrative aspect of the invention, there is provided a method for manufacturing a motor rotor support for supporting a magnetic body disposed on a rotor of a motor, the method comprising: subjecting a nonmagnetic steel to hot working and subsequently to cold working to obtain a cold-worked material; subjecting the cold-worked material to machining to obtain a support single material having a relative permeability of less than 1.005 and a 0.2% yield strength at room temperature of 600 MPa or more; and laminating and binding the support single materials.

According to a twelfth illustrative aspect of the invention, the cold working comprises a cold rolling step.

According to a thirteenth illustrative aspect of the invention, in the method for manufacturing a motor rotor support, the cold work rate of the cold working is from 5 to 40%.

According to a fourteenth illustrative aspect of the invention, in the method for manufacturing a motor rotor support, the machining comprises any one or more steps of carving, cold punching, cutting, laser processing, electric discharge machining, deep drawing, and welding.

According to a fifteenth illustrative aspect of the invention, in the method for manufacturing a motor rotor support, the nonmagnetic steel is an 18Mn-18Cr nonmagnetic steel.

According to a sixteenth illustrative aspect of the invention, in the method for manufacturing a motor rotor support, the binding is performed by any one of caulking, screwing, welding, adhering, and outer periphery shrink-fitting with a ring material or a combination thereof.

In the invention, a nonmagnetic steel is used and, after shaped as a motor rotor support, it has properties that the relative permeability is less than 1.005 and the 0.2% yield strength at room temperature (e.g., from 5° C. to 35° C.) is 550 MPa or more.

When the relative permeability is less than 1.005, the magnetic body can be supported without imparting any influence on the magnetism in the rotor. Moreover, when the 0.2% yield strength at room temperature is 550 MPa or more, the magnetic body can be surely supported even at high rotation and also weight saving becomes easy. When the lamination of single materials is adopted, even in the case of a relatively thick motor rotor support, it can be configured using single materials manufactured at a sufficient work rate.

In addition, the kind of the nonmagnetic steel is not limited to particular one in the invention but an 18Mn-18Cr material can be suitably used. The following will describe functions of each component and reasons for defining the composition for the 18Mn-18Cr nonmagnetic steel. Incidentally, in the chemical composition, "%" means "% by mass".

Si: 0.1 to 2.0% by Mass

Since Si is used as a deoxidizer, it is necessary to use 0.1% or more thereof. However, since Si is a ferrite phase-forming element, a ferrite phase may precipitate and cold workability becomes worse when Si is excessively contained, so that an upper limit thereof is set at 2.0%.

Mn: 10 to 25% by Mass

Mn is an austenite phase-forming element and 10% or more thereof is necessary for increasing N solubility. However, since the strength decreases when Mn is excessively contained, an upper limit thereof is set at 25%. Incidentally, for the same reasons, it is desirable that a lower limit thereof is set at 13% and the upper limit is set at 24%. It is further more desirable that the lower limit is set at 16% and the upper limit is set at 21%.

Cr: 12 to 25% by Mass

Cr is necessary in an amount of 12% or more for securing the N solubility. However, since Cr is a ferrite phase-forming element, a ferrite phase may precipitate when Cr is excessively contained, so that an upper limit thereof is set at 25%. Incidentally, for the same reasons, it is desirable that a lower limit thereof is set at 14% and the upper limit is set at 23%. It is further more desirable that the lower limit is set at 16% and the upper limit is set at 21%.

N: 0.3 to 0.8% by Mass

N is necessary in an amount of 0.3% or more for securing the strength but, since N causes blowhole formation when excessively contained, an upper limit thereof is set at 0.8%.

Al: 0.02% by Mass or Less

Al can be added as a deoxidizer but, since Al forms a nitride and decreases toughness when excessively contained, Al is contained as desired with setting an upper limit thereof at 0.02%. Incidentally, in order to sufficiently obtain the function as the deoxidizer, Al is desirably contained in an amount of 0.005% or more.

Ni: 5.0% by Mass or Less

Ni is an austenite phase-forming element and is contained as desired. However, since the strength decreases when the content exceeds 5.0%, an upper limit thereof is set at 5.0%. Moreover, when Al is positively contained, it is desirably contained in an amount of 1.0% or more, further preferably in an amount of 1.5% or more. Incidentally, Al may be contained in an amount of less than 1.0% as an inevitable impurity.

Mo+½W: 3.0% by Mass or Less

W and Mo are components that improve the strength and are contained as desired. However, since cold workability becomes worse when they are excessively contained, they can be contained each solely or in combination in the range of 3.0% or less in terms of Mo+½W. Incidentally, in the case where either of them is contained, it is desirable to set the content at 1.0% or more in terms of Mo+½W for obtaining the function sufficiently.

V, Nb: 1.00% by Mass or Less

V and Nb combine with nitrogen to form nitrides and thus prevent increase in crystal grain size during the thermal treatment, so that one or both thereof are contained as desired. However, they are ferrite phase-forming elements and hence a ferrite phase precipitates when they are excessively contained. Therefore, they can be contained each in the range of 1.00% or less. Incidentally, in the case where they are contained, they are desirably contained each in an amount of 0.05% or more for obtaining their function sufficiently.

Co: 3.00% by Mass or Less

Co is an austenite phase-forming element and is contained as desired. However, since it is an expensive component, it can be contained in an amount of 3.00% at maximum. Incidentally, in the case where it is contained, it is desirably contained each in an amount of 0.5% or more for obtaining its action sufficiently.

B: 0.01% by Mass or Less

B results in solid solution strengthening and also strengthening by a fine nitride can be expected. Thus, B improves strength and toughness, so that it is contained as desired. However, B forms a coarse nitride when excessively contained and the nitride becomes a factor of decreasing toughness. Therefore, it can be contained in the range of 0.01% or less. Incidentally, in the case where it is contained, it is desirably contained each in an amount of 0.003% or more for obtaining its action sufficiently.

Inevitable Impurities

C: 0.3% by Mass or Less

C is inevitably contained in manufacturing but, since it deteriorates corrosion resistance, an upper limit thereof is set at 0.3% by mass. For the same reason, the upper limit is further desirably set at 0.2% or less.

P, S: 0.03% by Mass or Less

P and S have an influence on ductility and toughness and also hot workability. Therefore, it is desirable to contain P and S each in an amount of 0.03% or less.

Manufacturing Steps

For the motor rotor support of the invention, manufacturing steps are not limited to particular ones, and the motor rotor support can be configured by manufacturing the single material via machining of a hot-worked material or a cold-worked material and laminating and binding the single materials.

A raw material can be obtained via usual melting and solidification process. Specifically, examples thereof include secondary refining methods such as a ladle refining method, a bottom pouring casting method, a top pouring casting method, a vacuum casting method, and electro slag remelting method. In addition, a billet material may be directly manufactured by a continuous casting method.

As hot working, hot rolling and hot forging such as hot die forging can be mentioned as representative examples, and they can be performed in a usual manner. The hot working temperature is, for example, from 800 to 1,200° C. As a method for obtaining a single material shape by hot working, there is a method of hot die working of a billet material or a steel billet manufactured by continuous casting. The hot die working is not particularly limited but the working can be carried out through performing die working once or plural times to form a shape near to the single material shape by hot pressing. Moreover, with regard to the die for die working, one kind or several kinds of dies may be used. Furthermore, the die working temperature for hot die working is equal to the aforementioned hot working temperature.

The hot-worked material before obtaining the single material for the support or the hot worked material before cold working may be subjected to a solid solution treatment. The conditions for the solid solution treatment are not particularly limited but there are exemplified 1,000° C. or more, 5 minutes or more as holding time, and water cooling, oil cooling and air cooling including fan cooling as cooling methods.

Moreover, after the solid solution treatment, a further increase in strength of the rotor support can be achieved by performing an aging treatment. The conditions for the aging treatment can be from 600 to 1,000° C. and 0.5 hours or more.

The hot worked material can afford a product shape without performing cold strong working thereafter.

The hot-worked material can be further subjected to cold working. As the cold working, cold rolling, cold forging, and the like may be mentioned and they can be performed in a usual manner. A further increase in strength can be achieved by work strengthening through the cold working.

The cold working can be, for example, performed at a work rate of 5 to 40%. When the work rate is low, the work strengthening is not sufficiently achieved and, when the work rate is high, ductility and toughness cannot be sufficiently obtained.

Moreover, in the cold rolling, examples of final sheet thickness include from 0.3 to 4 mm. When the sheet thickness is set at 0.3 to 4 mm, sheet thickness as a shaped raw material for the single material can be directly obtained. Incidentally, the "cold" used herein means working in a temperature range not exceeding recrystallization temperature and, for example, heating may be conducted in the range of less than 450° C. as desired. It is preferable to conduct it at 250° C. or less where temper color is not developed.

The machining is not limited to particular one in the invention and includes from fabrication of the shaped raw material until finishing. For example, there may be mentioned carving, cold punching, cutting, laser processing, electric discharge machining, deep drawing, and welding.

The single materials manufactured as above are laminated and bound. The motor rotor support may be configured by lamination of the single materials over the whole part or may be one partly having no lamination structure.

For binding, an appropriate method can be adopted and it is desirable to adopt a method that does not impart adverse influence on the relative permeability and strength as a whole. As the binding method, for example, there can be adopted caulking, screwing, welding, adhering, outer periphery shrink-fitting with a ring material, or the like. In the case of using a member for binding, it is desirable to use one in which the relative permeability and the strength satisfy the specified values of the single material.

Moreover, in order to obtain a final shape, laminated members may be assembled and welded. The welding method for assembling with welding is not particularly limited but TIG welding is preferred, where heat input is a little and a shielding property is high. After welding, stress-relief annealing at 300 to 600° C. may be performed as desired. Moreover, finishing may be performed on the support-shape material as desired. In the case where a defect remains, it may be repaired by welding repair.

By the aforementioned methods, it becomes possible to manufacture a support suitable for a motor rotor, particularly a rotor of an axial gap motor, which can be applicable to mass production and can be financially inexpensively manufactured.

Advantageous Effects of Invention

According to the invention, there can be obtained a motor rotor support in which sufficiently low relative permeability and high strength are obtained, high strength is achieved with maintaining a nonmagnetic property, and further there is no limitation on manufacturing steps. In addition, it becomes easy to change the thickness of the motor rotor support by the lamination number or the like.

BRIEF DESCRIPTION OF DRAWINGS

FIG. 1(a) and FIG. 1(b) are drawings showing a motor rotor support of one embodiment of the invention, in which FIG. 1(a) is a front view, and FIG. 1(b) is a cross-sectional view taken along line I-I in FIG. 1(a).

FIG. 2(a) and FIG. 2B are drawings showing a motor rotor support on which a permanent magnet is disposed, in which FIG. 2(a) is a front view, and FIG. 2B is a cross-sectional view taken along line II-II in FIG. 2(a).

DESCRIPTION OF EMBODIMENTS

Figure 1:
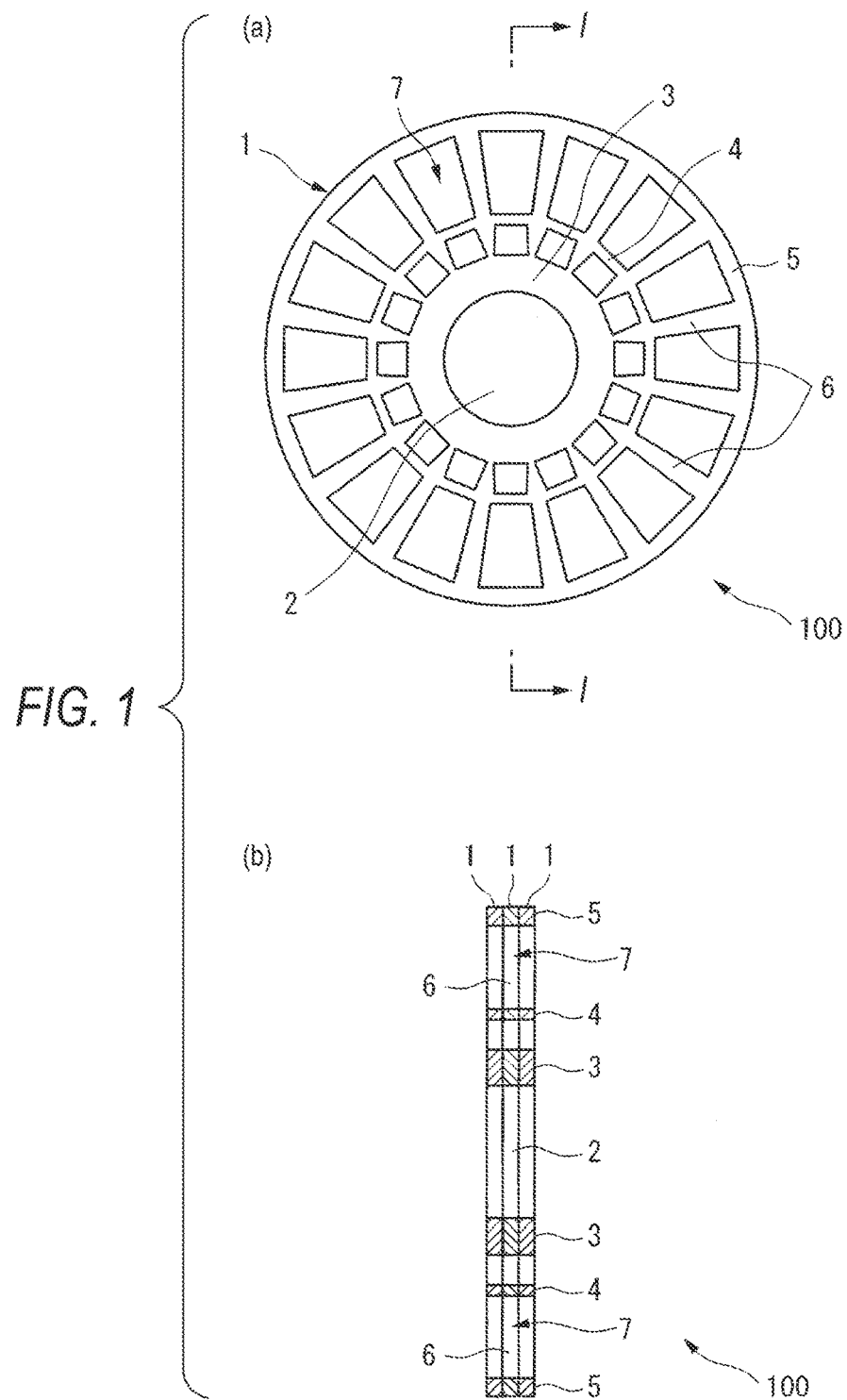
Figure 2:
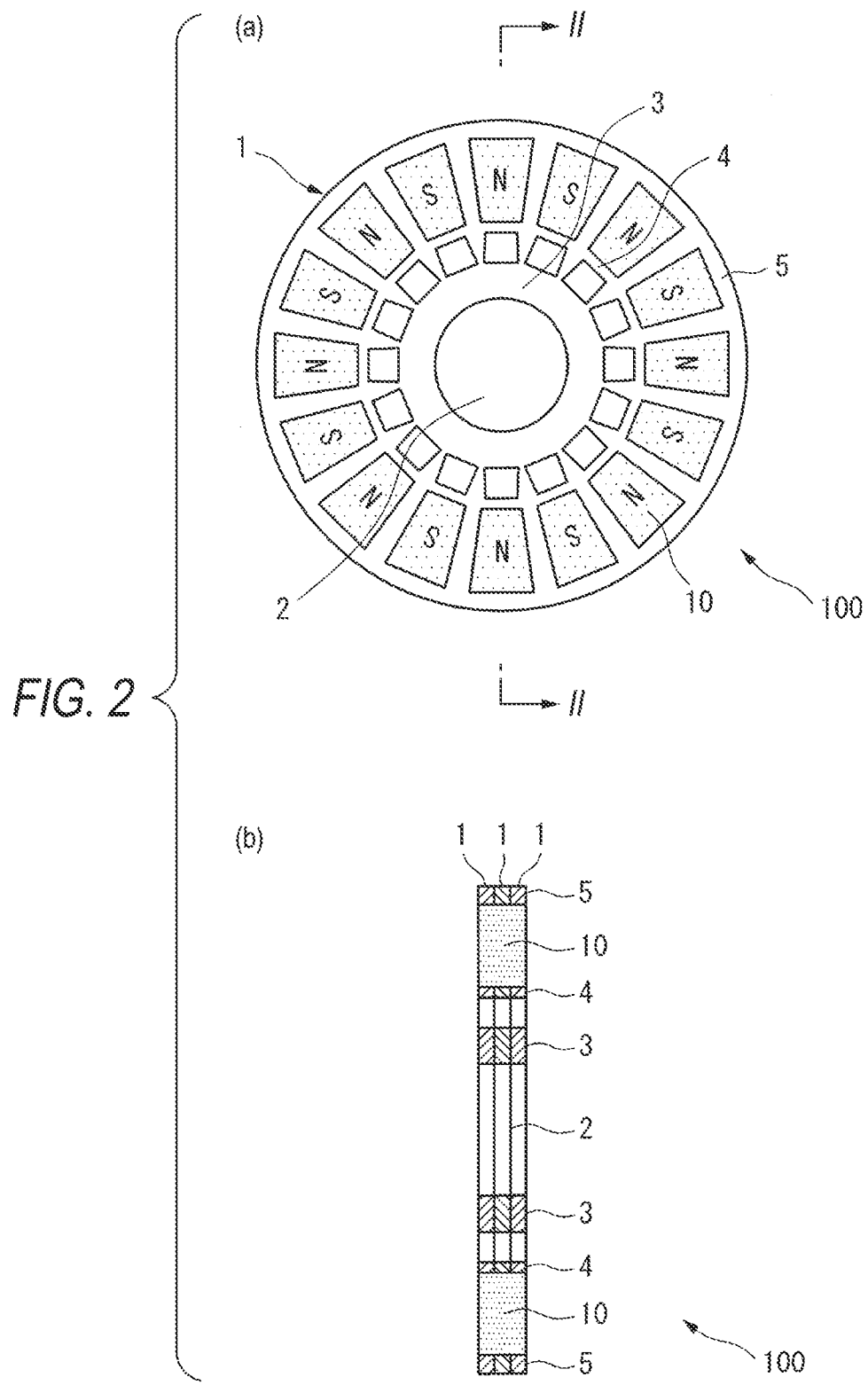

The following will describe the motor rotor support of one embodiment of the present invention based on FIGS. 1 and 2.

The single material 1 for use in the motor rotor support of the embodiment is configured by a hot-worked material or a cold-worked material composed of a nonmagnetic steel. The hot-worked material has properties that the relative permeability is less than 1.005, the 0.2% yield strength at room temperature is 550 MPa or more, and the elongation is 10% or more, and the cold-worked material has properties that the relative permeability is less than 1.005, the 0.2% yield strength at room temperature is 600 MPa or more, and the elongation is 30% or more. As the nonmagnetic steel, an 18Mn-18Cr nonmagnetic steel is suitably used.

As shown in FIG. 1(a) and FIG. 1(b), the single material 1 is formed as an entirely thin-sheet disk shape and has a bearing part 3 having a shaft hole 2 formed at the center. A ring-shape rib 4 is formed at an outer periphery side of the bearing part 3 at a distance and an outer edge ring 5 is formed at the outermost peripheral edge. Furthermore, partition walls 6 (16 partition walls in the embodiment of the invention) are formed radially at equal angle intervals from the bearing part 3 through the ring-shape rib 4 until the outer edge ring 5. By laminating and binding a plurality of the single materials 1, a motor rotor support 100 is obtained.

A space surrounded by the partition walls 6, 6, the ring-shape rib 4, and the outer edge ring 5 is assigned to a magnet housing part 7. As shown in FIG. 2(a) and FIG. 2(b), a permanent magnet 10 having magnetic poles that have different polarities at both surfaces in an axis direction is housed in the magnet housing part 7 ranged by the laminated single materials 1. The permanent magnets 10 are arranged so that adjacent ones have magnetic poles different from each other in a circumference direction.

A rotary shaft not shown in the figure is attached to the shaft hole 2 of the motor rotor support 100 and thus the whole can be used as a motor rotor support fitted with a rotor. Incidentally, the motor rotor support 100 may be used as a rotor as it is.

In the above, only a permanent magnet is described as a magnetic body to be supported by the motor rotor support but, in addition, one having a structure in which various strong magnetic bodies such as a dust core may be used.

In the invention, the magnetic body means a substance easily magnetized in a magnetic field, and the magnetic body may include a rare-earth magnet, a non-rare-earth magnet, a dust core, and the like. Examples of the rare-earth magnet include a neodymium-iron-boron magnet and examples of the non-rare-earth magnet may include a ferrite magnet.

The motor rotor support of the embodiment is not particularly limited on output and the like but particularly, it can be suitably used in a motor of 5 kW or more. It can be applicable to mass production, can be inexpensively manufactured financially, and can be particularly used as a support suitable for the rotor of an axial gap motor.

Next, the manufacturing steps of the motor rotor support 1 will be described based on the flow charts of FIG. 3(a) and FIG. 3(b).

Figure 3:
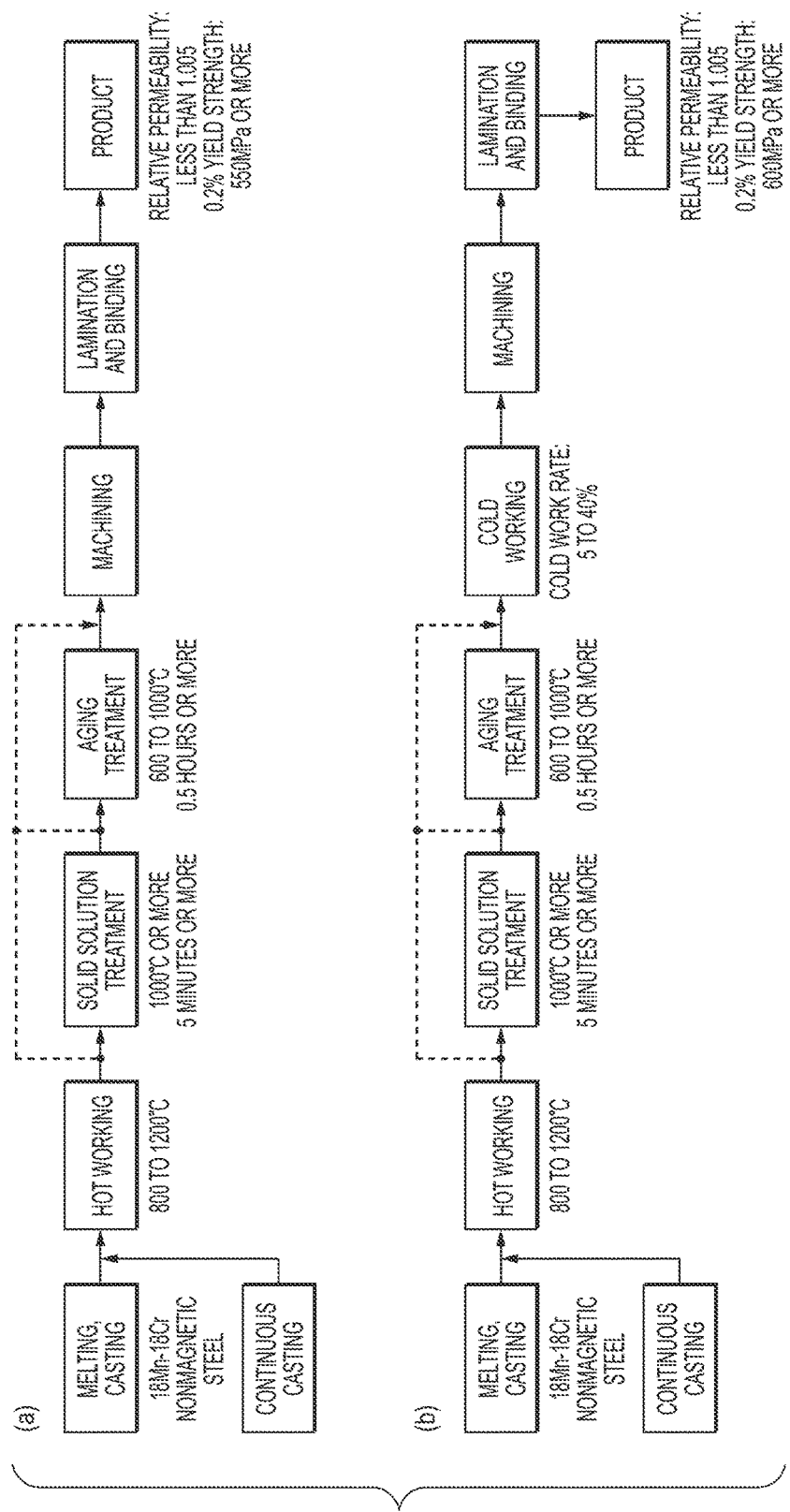
FIG. 3(a) and FIG. 3(b) are flow charts showing manufacturing steps.

As shown in FIG. 3(a), an ingot is produced by preparation into the composition of the 18Mn-18Cr nonmagnetic steel as described above and by usual melting and casting methods. As the melting and casting methods, a ladle refining method, a bottom pouring casting method, a top pouring casting method, a vacuum casting method, an electro slag remelting method, or the like can be adopted but the method is not limited to a particular method in the invention.

The ingot is intermediately molded into a billet by hot forging or the like that is hot working and further subjected to hot working such as hot rolling. The hot working can be performed by heating the raw material to 800 to 1,200° C.

Moreover, the billet can be directly obtained by not the above-described melting and casting methods but a continuous casting method. In the embodiment, the kind of the continuous casting method is not particularly limited and the method can be carried out in a usual manner.

In the hot working, processing can be achieved into a shaped raw material form by hot die forging. One having a shaped raw material form can be then processed into a product shape by finishing. For example, a product can be efficiently manufactured by hot die forging of the billet obtained by continuous casting.

The hot-worked material obtained by hot working is desirably subjected to a solid solution treatment in which the material is heated at 1,000° C. or more for 5 minutes or more. Thereby, homogenization of components is achieved and also austenite is stabilized.

The hot-worked material subjected to the solid solution treatment is further desirably subjected to an aging treatment under conditions of 600 to 1,000° C. and 0.5 hours or more. By the aging treatment, the strength can be further improved.

In the invention, it is also possible to omit the above-described solid solution treatment and aging treatment. Incidentally, the solid solution treatment is performed in the case where the aging treatment is performed.

The hot-worked material is converted into the single material shape via further machining.

The machining includes carving, cold punching, cutting, laser processing, electric discharge machining, deep drawing, welding, and the like. The machining includes finishing.

The motor rotor support 1 obtained in the embodiment has a relative permeability of less than 1.005 and a 0.2% yield strength at room temperature of 550 MPa or more and thus has an excellent nonmagnetic property and also high strength, so that the support can stably support a magnetic body at high-speed rotation. Moreover, the motor rotor support 1 desirably has an elongation at room temperature of 30% or more.

Moreover, in the invention, as for the method for manufacturing the motor rotor support 1, the cold-worked material can be also obtained by cold working after the nonmagnetic steel is subjected to hot working.

The following will describe the manufacturing steps including the cold working.

As shown in FIG. 3(b), first, an ingot is produced by preparation into the composition of the 18Mn-18Cr nonmagnetic steel as described above and by usual melting and casting methods. The ingot is intermediately molded into a billet by hot forging or the like that is hot working and further subjected to hot working such as hot rolling. The hot working can be performed by heating the raw material to 800 to 1,200° C.

Moreover, the billet can be directly obtained by the continuous casting method.

The hot-worked material obtained by hot working is desirably subjected to a solid solution treatment in which the material is heated at 1,000° C. or more for 5 minutes or more. The hot-worked material subjected to the solid solution treatment is desirably further subjected to an aging treatment under conditions of 600 to 1,000° C. and 0.5 hours or more. The strength can be further improved by the aging treatment. For example, the strength is increased by about 100 to 300 MPa by performing the solid solution treatment and the aging treatment. Incidentally, in the case where the cold working is performed, the aging treatment can be performed before the cold working or after the cold working.

Incidentally, in the invention, it is also possible to omit the above-described solid solution treatment and aging treatment.

The hot-worked material can be further subjected to cold working such as cold rolling. In the cold working, the working can be performed at a cold work rate of 5 to 40%. Incidentally, as described above, the cold working means working in a temperature range not exceeding the recrystallization temperature and working in a temperature range exceeding the recrystallization temperature is called hot working. After working, for the purpose of relieving stress, stress-relief annealing at 300 to 450° C. may be performed. The required mechanical properties are not influenced by the stress-relief annealing.

The cold-worked material subjected to the cold working is converted into a single material shape via further machining.

The machining includes carving, cold punching, cutting, laser processing, electric discharge machining, deep drawing, welding, and the like. The machining includes finishing. Moreover, the machining may have a step of obtaining a product shape by assembling and welding the members one another.

The obtained single material for a motor rotor support has a relative permeability of less than 1.005 and a 0.2% yield strength at room temperature of 600 MPa or more and thus has an excellent nonmagnetic property and also has high strength, so that it can stably support a magnetic body at high-speed rotation. Moreover, the single material for a motor rotor support desirably has an elongation at room temperature of 10% or more.

The rotor support used at high rotation is deformed by centrifugal force and the like. Since ductility and toughness for endurance against the force are also necessary, the elongation is desirably 10% or more in either case of the hot-worked material and the cold-worked material. In the case where the elongation is considered important, owing to high elongation, the hot-worked material is advantageous as compared with the cold-worked material.

The obtained single materials are further laminated and bound. Each single material to be laminated may have the same shape or may be different in shape of a single material.

The binding method is not particularly limited and an appropriate method such as caulking, screwing, welding, adhering, or outer periphery shrink-fitting with a ring material can be adopted.

Figure 4:
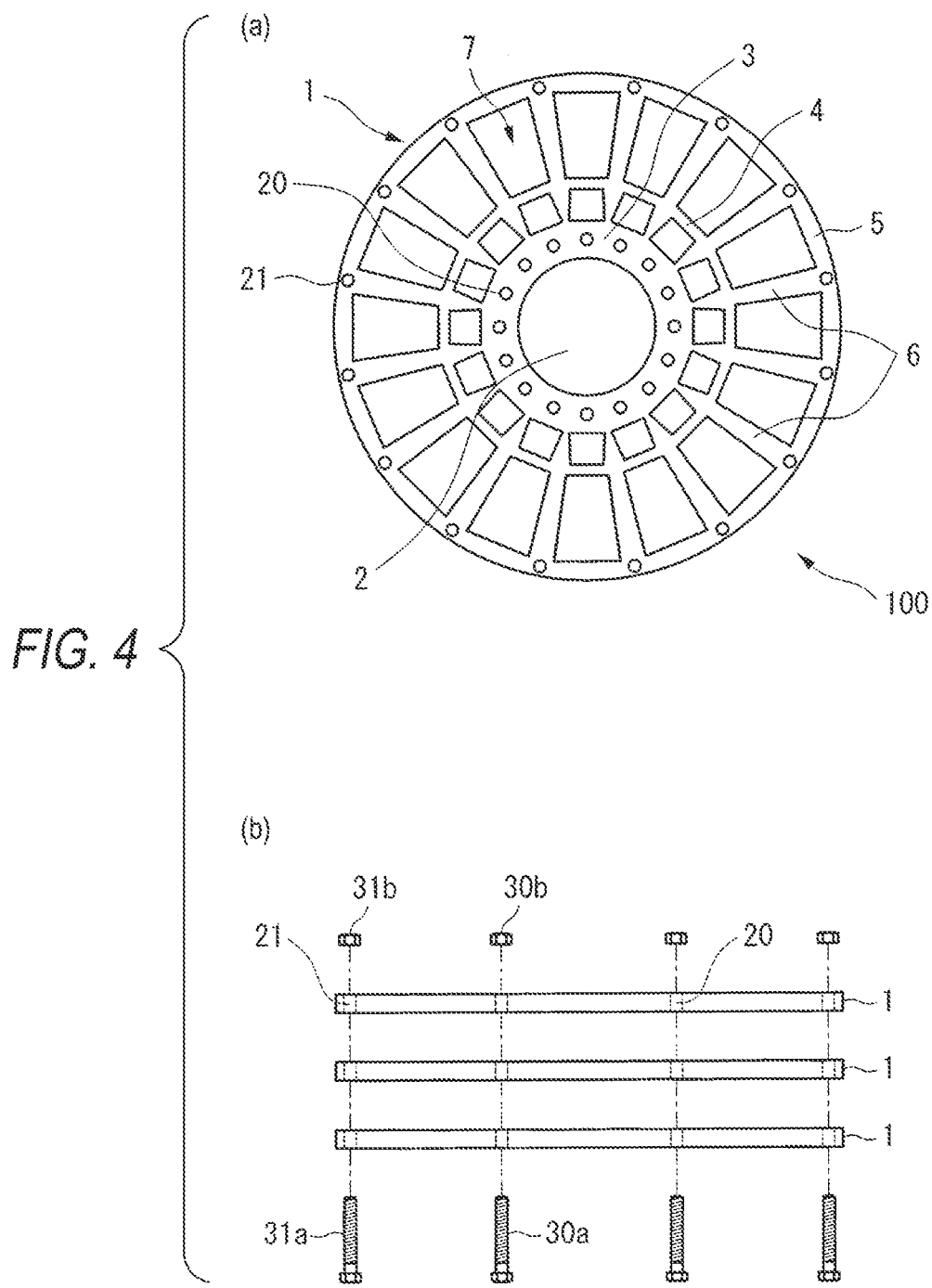
FIG. 4(a) and FIG. 4(b) are drawings showing a method using screwing as a binding method.

FIG. 4(a) and FIG. 4(b) are drawings that explain binging by screwing.

The configuration of each single material 1 is similar to one explained with reference to FIG. 1(a) and FIG. 1(b). The single material has a bearing part 3 having a shaft hole 2 formed at the center, a ring-shape rib 4 is formed at an outer periphery side of the bearing part 3 at a distance, and an outer edge ring 5 is formed at the outermost peripheral edge. Sixteen partition walls 6 are formed radially at equal angle intervals from the bearing part 3 through the ring-shape rib 4 until the outer edge ring 5.

In the single material of the embodiment, as shown in FIG. 4(a), screw holes 20 passing through an axis direction are further formed at the bearing part 3 corresponding to the angle positions at which the partition walls 6 are located, and screw holes 21 passing through in the axis direction are further formed at the outer edge ring 5 corresponding to the angle positions at which the partition walls 6 are located. The screw holes 20, 21 can be together formed at machining or only the screw holes may be formed at a subsequent step.

At binding, as shown in FIG. 4(b), individual single materials can be bound by laminating the single materials, inserting screws 30a, 31a from one end side of each of the screw holes 20, 21, respectively, and screwing the screws into nuts 31a, 31b at another end side. Incidentally, grooves may be formed on the screw holes 20, 21 and the screws 30a, 31a may be directly screwed therein.

Figure 5:
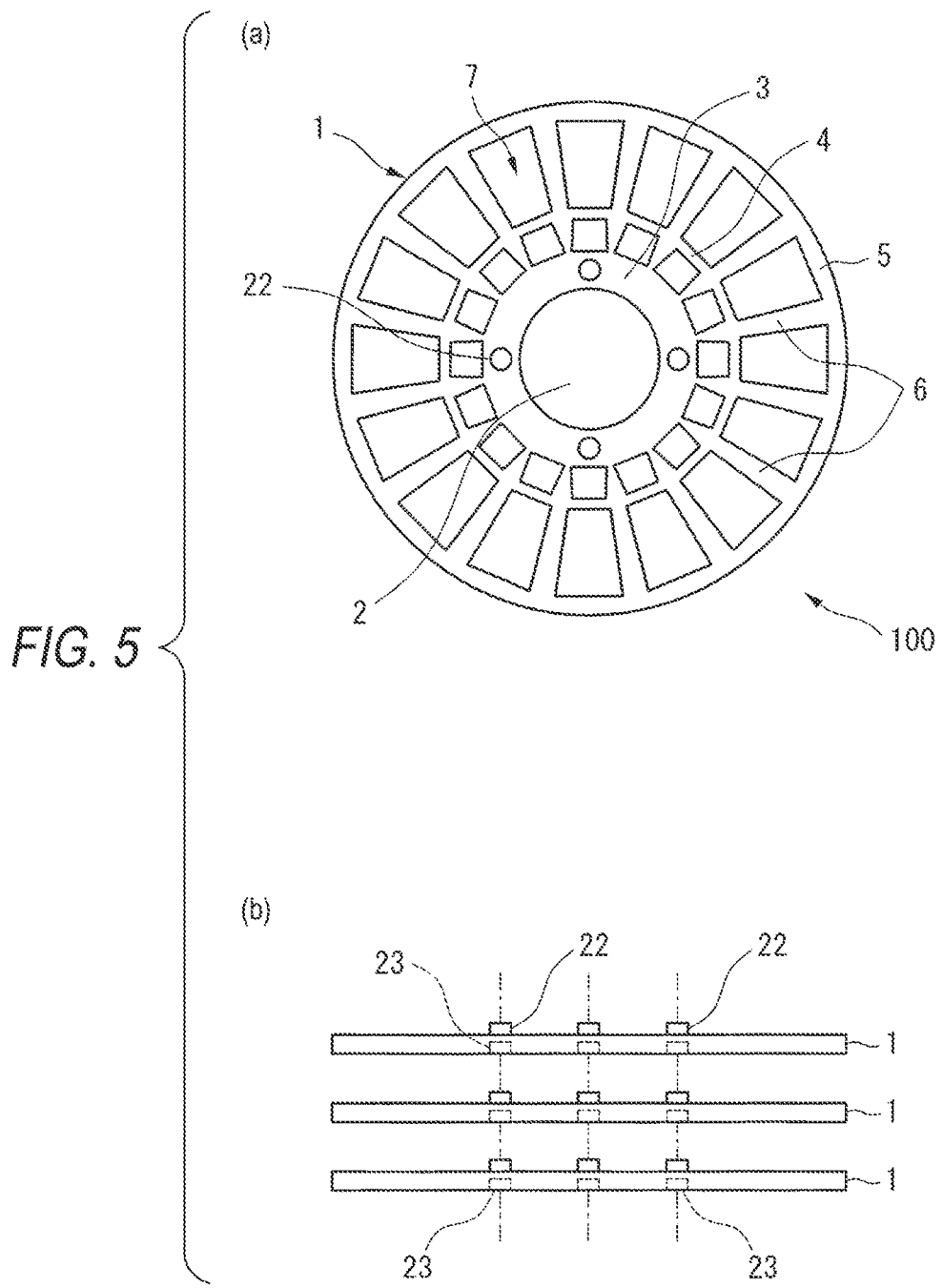
FIG. 5(a) and FIG. 5(b) are drawings showing a method using caulking as a binding method.

FIG. 5(a) and FIG. 5(b) show an example of binding the single materials by caulking.

In this example, convex parts 22 are provided at appropriate sites on one surface of the single material 1 and concave parts 23 are provided at positions corresponding to the convex parts 22 on another surface of the single material 1. In this example, the convex parts 22 and the concave parts 23 are formed at the bearing part 3 along the circumference direction at intervals of 90 degrees. At the time when the single materials 1 are overlaid each other, the single materials 1, 1 are caulked and bound each other by pressing the convex part 22 of the single material 1 into the concave part 23 of the other single material 1 overlaid. By this method, any number of the single materials 1 can be overlaid and laminated.

The above-described convex part 22 and concave part 23 can be, for example, shaped at plural sites simultaneously at the time of plate punching or the like in machining. In this case, die surfaces corresponding to the convex part 22 and the concave part 23 are previously formed on an upper die and a lower die for punching, and a convex part and a concave part can be shaped at paired positions on the upper surface and the lower surface in a punching direction at the time of punching.

By caulking of such concave and convex parts, centering in a lamination direction can be easily achieved. As a caulking operation, a plurality of the single materials are overlaid and then integrated by imparting pressing pressure, and thereby manufacture with high productivity can be achieved with good accuracy in the centering of a lamination type support. Incidentally, the caulking structure is not limited to the above-described one and any appropriate structure can be adopted.

EXAMPLES

As 18Mn-18Cr nonmagnetic steels to be used in the present examples, those having a composition shown in Table 1 (the remainder: Fe and inevitable impurities, P: 0.025% or less, S: 0.005% or less) were prepared (Steel Nos. 1 to 15).

Example 1 (A Case of Manufacturing Support-Shape Materials from Hot-Worked Materials)

Fifty kilograms of each of 18Mn-18Cr nonmagnetic steels (Steel Nos. 1 to 9) shown in Table 1 was melted by VIM (vacuum induction melting) and subjected to die casting to obtain 50 kg of a test steel ingot. A main part obtained by cutting the riser from the test steel ingot was subjected to hot forging at 1,200° C. and to hot rolling at a hot rolling work rate shown in Tables 2 and 3 to form a test material having a thickness of 4 to 6 mm and a width of 200 mm. As comparative ones, test materials were obtained in the same manner using nonmagnetic steels (Steel Nos. 10 to 13) having a composition out of the range of the invention, a commercially available SUS304 stainless steel (Steel No. 15), and a commercially available SUS316 stainless steel (Steel No. 14).

These test materials were subjected to a water-cooling solid solution treatment at 1,050° C. for 3 hours. Furthermore, a part of the test materials to which V and/or Nb had been added were also subjected to an aging treatment at 900° C. for 1 hour after the solid solution treatment.

Sample materials corresponding to the support-shape materials were obtained from these test materials by performing cold punching at room temperature through cold pressing. JIS14A test pieces described in JIS Z 2201 were sampled from the sample materials at room temperature and subjected to a tensile test based on JIS Z 2241 and measurement of relative permeability by a magnetic balance method was performed.

Example 2 (A Case of Manufacturing Support-Shape Materials from Cold-Rolled Materials)

Fifty kilograms of each of 18Mn-18Cr nonmagnetic steels (Steel Nos. 1 to 9) shown in Table 1 was melted by VIM (vacuum induction melting) and subjected to die casting to obtain 50 kg of a test steel ingot. A main part obtained by cutting the riser from the test steel ingot was subjected to hot forging at 1,200° C. and to hot rolling at a hot rolling work rate shown in Tables 2 and 3 to form a test material having a thickness of 4 to 6 mm and a width of 200 mm. As comparative ones, test materials were obtained in the same manner using nonmagnetic steels (Steel Nos. 10 to 13) having a composition out of the range of the invention, a commercially available SUS304 stainless steel (Steel No. 15), and a commercially available SUS316 stainless steel (Steel No. 14).

These test materials were subjected to a water-cooling solid solution treatment at 1,050° C. for 3 hours. Furthermore, a part of the test materials to which V and/or Nb had been added were subjected to an aging treatment at 900° C. for 1 hour after the solid solution treatment.

These test materials were subjected to from 5 to 50% cold rolling as shown in Tables 2 and 3 to obtain test materials having a thickness of 2 to 5 mm. Sample materials corresponding to the support-shape materials were obtained from these test materials by performing cold punching at room temperature through cold pressing. Test pieces were sampled from the sample materials in the same manner as in Example 1, and the tensile test and measurement of relative permeability by a magnetic balance method were performed at room temperature.

Test results are shown in Tables 2 and 3. From the test results, in Example 1, it is realized that the sample materials of Inventive Examples (Sample Material Nos. 1, 5, 9, 13, 17, 21, 25, 29, 33, 37, and 41) secure a 0.2% yield strength of 550 MPa or more and the relative permeability is also sufficiently low. On the other hand, the 0.2% yield strength in Comparative Examples is on such a level as less than 400 MPa except for Steel No. 12 (Sample Material Nos. 45, 49, 57, 61, and 65), and the sample material (No. 53) of Steel No. 12 has high 0.2% yield strength but has also high relative permeability and thus is inferior in relative magnetic permeability, so that the materials of Comparative Examples are said to be unsuitable for a motor rotor support.

In Example 2, it is realized that the relative permeability of the sample materials of Inventive Examples exhibit no change even when cold working was carried out and the transformation into ferrite or martensite through strain induction is absent (Sample Material Nos. 2 to 4, 4 to 7, 10 to 12, 14 to 16, 18 to 20, 22 to 24, 26 to 28, 30 to 32, 34 to 36, 38 to 40, and 42 to 44). On the other hand, in the sample materials of Comparative Examples, the relative permeability increases as the cold rolling work rate increases and occurrence of strain induced transformation is shown (Sample Material Nos. 46 to 48, 50 to 52, 54 to 56, 58 to 60, 62 to 64, and 66 to 68), so that it is realized that the sample materials of Comparative Examples are inferior in relative magnetic permeability to the sample materials of Inventive Examples.

Figure 6:
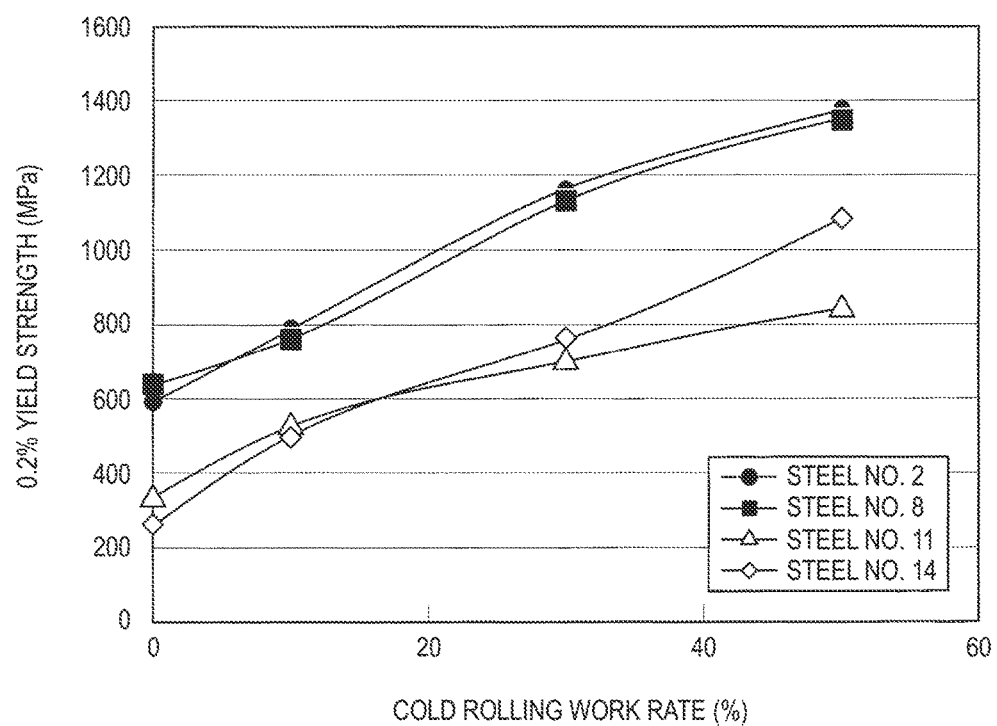
FIG. 6 is a graph showing a relationship between cold rolling work rate and 0.2% yield strength at room temperature in a part of sample materials in Examples.
Figure 7:
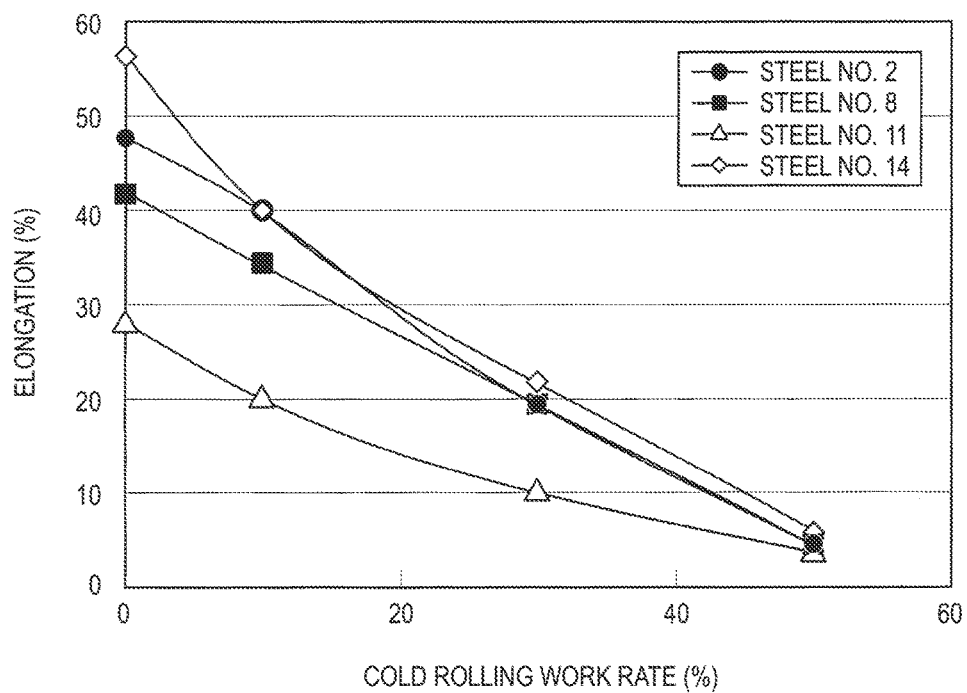
FIG. 7 is a graph showing a relationship between cold rolling work rate and elongation at room temperature in a part of sample materials in Examples.
Figure 8:
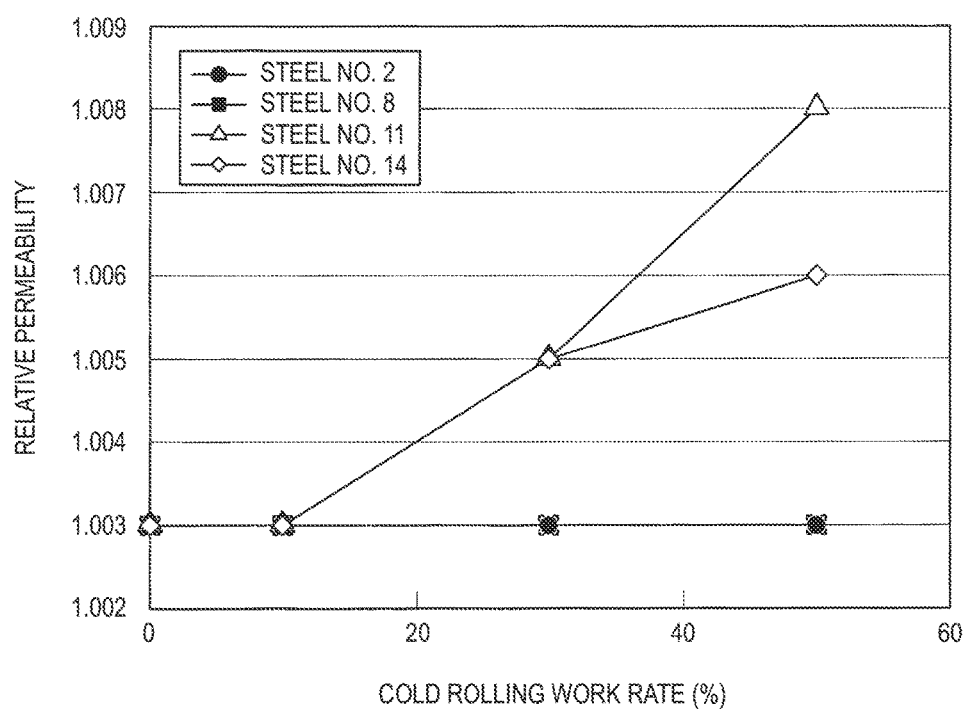
FIG. 8 is a graph showing a relationship between cold rolling work rate and relative permeability in a part of sample materials in Examples.

In addition, based on the data of Steel Nos. 2, 8, 11, and 14 among the above sample materials, graphs showing relationships between the cold rolling work rate and the 0.2% yield strength, elongation, and relative permeability were prepared and shown in FIGS. 6, 7 and 8.

As shown in FIG. 6, in all the sample materials, the 0.2% yield strength increases as the cold rolling work rate increases. However, it is realized that the sample materials of Inventive Examples of the present application have larger 0.2% yield strength as compared with the sample materials of Comparative Examples, regardless of the cold rolling work rate, and thus are excellent in strength.

Moreover, as shown in FIG. 7, in all the sample materials, the elongation decreases as the cold rolling work rate increases. However, the sample materials of Inventive Examples of the present application have high elongation until a cold rolling work rate of about 40% as compared with Steel No. 11 of Comparative Example.

Furthermore, as shown in FIG. 8, the sample materials of Inventive Examples of the present application exhibit almost no change in the relative permeability even when the cold rolling work rate increases and thus have a stable nonmagnetic property. On the other hand, in the sample materials of Comparative Examples, the relative permeability sharply increases when the cold rolling work rate increases, so that it is realized that the relative permeability is adversely influenced.

From these points, it is realized that it is difficult to enhance the strength by cold working with maintaining the nonmagnetic property in the sample materials of Comparative Examples but the strength can be enhanced by cold working with maintaining the nonmagnetic property in the sample materials of Inventive Examples.

TABLE 1

| | Steel No. | Nonmagnetic steel composition (% by mass) | | | | | | | | | | | |
|---|---|---|---|---|---|---|---|---|---|---|---|---|---|
| | | C | Si | Mn | Ni | Cr | Mo | W | V | Nb | Al | N | Others |
| Inventive Example | 1 | 0.05 | 0.48 | 18.9 | 0.49 | 18.6 | — | — | — | — | 0.01 | 0.73 | — |
| | 2 | 0.06 | 0.49 | 20.1 | — | 18.6 | — | — | — | — | 0.01 | 0.68 | — |
| | 3 | 0.19 | 1.38 | 11.2 | 1.98 | 24.3 | — | — | — | — | 0.01 | 0.79 | B: 0.005 |

TABLE 1-continued

| | Steel No. | Nonmagnetic steel composition (% by mass) | | | | | | | | | | |
|---|---|---|---|---|---|---|---|---|---|---|---|---|
| | | C | Si | Mn | Ni | Cr | Mo | W | V | Nb | Al | N | Others |
| | 4 | 0.08 | 0.56 | 23.8 | 0.97 | 12.9 | 0.98 | 1.02 | 0.09 | 0.11 | 0.01 | 0.56 | — |
| | 5 | 0.04 | 1.02 | 15.2 | 4.08 | 19.8 | 1.97 | — | 0.28 | — | — | 0.78 | Co: 1.02 |
| | 6 | 0.29 | 0.46 | 18.6 | 0.51 | 19.2 | — | 2.98 | — | 0.41 | 0.01 | 0.44 | — |
| | 7 | 0.21 | 0.52 | 22.8 | 0.54 | 12.5 | — | — | — | — | 0.01 | 0.35 | — |
| | 8 | 0.12 | 0.56 | 24.2 | 0.61 | 22.4 | 1.51 | 3.15 | 0.51 | — | 0.01 | 0.78 | — |
| | 9 | 0.06 | 0.59 | 18.3 | 0.58 | 19.5 | — | — | — | 0.41 | 0.01 | 0.56 | — |
| Comparative | 10 | 0.05 | 0.48 | 16.2 | 0.51 | 16.2 | — | — | — | — | 0.01 | 0.22 | — |
| Example | 11 | 0.45 | 0.52 | 9.3 | 6.21 | 20.2 | — | — | — | — | 0 | 0.51 | — |
| | 12 | 0.04 | 4.12 | 18.2 | — | 16.3 | 5.02 | — | — | 0.42 | 0.01 | 0.63 | — |
| | 13 | 0.06 | 0.53 | 26.5 | 3.12 | 11.1 | 2.11 | 4.98 | 0.11 | — | 0 | 0.49 | — |
| | 14 | 0.05 | 0.49 | 0.54 | 12.1 | 18.1 | 2.06 | — | — | — | 0.01 | 0.04 | — |
| | 15 | 0.04 | 0.52 | 0.53 | 8.31 | 18.3 | — | — | — | — | 0.01 | 0.10 | — |

TABLE 2

| | Sample material No. | Steel No. | Hot rolling work rate (%) | Solid solution treatment | Aging treatment | Cold rolling work rate (%) | 0.2% Y.S. (MPa) | Elongation (%) | Relative permeability |
|---|---|---|---|---|---|---|---|---|---|
| Inventive Example | 1 | 1 | 90 | 1050° C. × 3 h | — | — | 569 | 48.2 | 1.002 |
| | 2 | | | | | 5 | 701 | 45.1 | 1.002 |
| | 3 | | | | | 30 | 1125 | 20.9 | 1.002 |
| | 4 | | | | | 50 | 1369 | 3.1 | 1.002 |
| | 5 | 2 | 90 | 1050° C. × 3 h | — | — | 573 | 47.8 | 1.003 |
| | 6 | | | | | 10 | 769 | 39.7 | 1.003 |
| | 7 | | | | | 30 | 1154 | 18.9 | 1.003 |
| | 8 | | | | | 50 | 1372 | 4.2 | 1.003 |
| | 9 | 3 | 80 | 1050° C. × 3 h | — | — | 557 | 48.9 | 1.003 |
| | 10 | | | | | 10 | 698 | 42.0 | 1.003 |
| | 11 | | | | | 40 | 1122 | 15.1 | 1.003 |
| | 12 | | | | | 50 | 1311 | 2.8 | 1.003 |
| | 13 | 4 | 90 | 1050° C. × 3 h | 900° C. × 1 h | — | 553 | 54.6 | 1.003 |
| | 14 | | | | | 5 | 621 | 45.5 | 1.003 |
| | 15 | | | | | 30 | 998 | 32.1 | 1.003 |
| | 16 | | | | | 50 | 1256 | 8.9 | 1.003 |
| | 17 | 5 | 90 | 1050° C. × 3 h | 900° C. × 1 h | — | 572 | 49.8 | 1.002 |
| | 18 | | | | | 10 | 749 | 41.5 | 1.002 |
| | 19 | | | | | 30 | 1098 | 21.9 | 1.002 |
| | 20 | | | | | 50 | 1362 | 3.4 | 1.002 |
| | 21 | 6 | 50 | 1050° C. × 3 h | 900° C. × 1 h | — | 563 | 58.9 | 1.003 |
| | 22 | | | | | 10 | 721 | 41.3 | 1.003 |
| | 23 | | | | | 40 | 1151 | 13.9 | 1.003 |
| | 24 | | | | | 50 | 1312 | 3.1 | 1.003 |
| | 25 | 7 | 80 | 1050° C. × 3 h | — | — | 559 | 57.6 | 1.002 |
| | 26 | | | | | 5 | 631 | 47.3 | 1.002 |
| | 27 | | | | | 30 | 987 | 25.6 | 1.002 |
| | 28 | | | | | 50 | 1224 | 8.8 | 1.002 |
| | 29 | 8 | 90 | 1050° C. × 3 h | 900° C. × 1 h | — | 635 | 42.1 | 1.003 |
| | 30 | | | | | 10 | 751 | 34.1 | 1.003 |
| | 31 | | | | | 30 | 1132 | 18.9 | 1.003 |
| | 32 | | | | | 50 | 1356 | 4.1 | 1.003 |
| | 33 | | | | | — | 581 | 43.3 | 1.004 |
| | 34 | | | | | 10 | 778 | 36.5 | 1.004 |
| | 35 | | | | | 30 | 1161 | 16.5 | 1.004 |
| | 36 | | | | | 50 | 1375 | 2.5 | 1.004 |
| | 37 | 9 | 80 | 1050° C. × 3 h | 900° C. × 1 h | — | 612 | 39.9 | 1.002 |
| | 38 | | | | | 5 | 730 | 30.5 | 1.002 |
| | 39 | | | | | 30 | 1125 | 16.4 | 1.002 |
| | 40 | | | | | 50 | 1456 | 1.9 | 1.002 |
| | 41 | | | | | — | 530 | 48.1 | 1.003 |
| | 42 | | | | | 5 | 658 | 45.0 | 1.003 |
| | 43 | | | | | 30 | 1086 | 20.8 | 1.003 |
| | 44 | | | | | 50 | 1277 | 2.0 | 1.003 |

TABLE 3

| | Sample material No. | Steel No. | Hot rolling work rate (%) | Solid solution treatment | Aging treatment | Cold rolling work rate (%) | 0.2% Y.S. (MPa) | Elongation (%) | Relative permeability |
|---|---|---|---|---|---|---|---|---|---|
| Comparative Example | 45 | 10 | 90 | 1050° C. × 3 h | — | — | 351 | 59.6 | 1.003 |
| | 46 | | | | | 10 | 535 | 48.8 | 1.003 |
| | 47 | | | | | 40 | 859 | 24.0 | 1.006 |
| | 48 | | | | | 50 | 1098 | 8.9 | 1.008 |
| | 49 | 11 | 50 | 1050° C. × 3 h | — | — | 339 | 28.6 | 1.003 |
| | 50 | | | | | 10 | 524 | 19.8 | 1.003 |
| | 51 | | | | | 30 | 712 | 9.5 | 1.005 |
| | 52 | | | | | 50 | 849 | 3.6 | 1.008 |
| | 53 | 12 | 90 | 1050° C. × 3 h | 900° C. × 1 h | — | 621 | 21.4 | 1.010 |
| | 54 | | | | | 5 | 721 | 10.1 | 1.010 |
| | 55 | | | | | 30 | 897 | 5.6 | 1.012 |
| | 56 | | | | | 50 | 1046 | 1.5 | 1.015 |
| | 57 | 13 | 70 | 1050° C. × 3 h | 900° C. × 1 h | — | 348 | 49.6 | 1.003 |
| | 58 | | | | | 10 | 589 | 38.5 | 1.005 |
| | 59 | | | | | 30 | 792 | 27.6 | 1.006 |
| | 60 | | | | | 50 | 1121 | 10.5 | 1.008 |
| | 61 | 14 | 90 | 1050° C. × 3 h | — | — | 246 | 56.7 | 1.003 |
| | 62 | | | | | 10 | 499 | 39.9 | 1.003 |
| | 63 | | | | | 30 | 759 | 21.4 | 1.005 |
| | 64 | | | | | 50 | 1089 | 5.5 | 1.006 |
| | 65 | 15 | 90 | 1050° C. × 3 h | — | — | 212 | 50.2 | 1.003 |
| | 66 | | | | | 10 | 469 | 37.6 | 1.004 |
| | 67 | | | | | 30 | 786 | 18.9 | 1.006 |
| | 68 | | | | | 50 | 1142 | 4.9 | 1.010 |

While the invention has been described in detail and with reference to specific embodiments thereof, it will be apparent to one skilled in the art that various changes and modifications can be made therein without departing from the spirit and scope thereof. The present application is based on Japanese Patent Application No. 2012-77892 filed on Mar. 29, 2012, and the contents are incorporated herein by reference.

REFERENCE SIGNS LIST

1: Single material
2: Shaft hole
3: Bearing part
4: Ring-shape rib
5: Outer edge ring
6: Partition wall
7: Magnet housing part
10: Permanent magnet
20: Screw hole
21: Screw hole
30*a*: Screw
30*b*: Nut
31*a*: Screw
31*b*: Nut
22: Convex part
23: Concave part
100: Motor rotor support

The invention claimed is:

1. A motor rotor support for supporting a magnetic body disposed on a rotor of a motor,
wherein the support is obtained by laminating single materials each of which is formed from a hot-worked material or a cold-worked material obtained from a nonmagnetic steel and has a relative permeability of less than 1.005 and a 0.2% yield strength at room temperature of 550 MPa or more,
wherein the laminated single materials form a magnet housing in which the magnetic body is disposed, such that all of the single materials support the magnetic body disposed therein,
wherein each of the single materials is configured as a disk shape,
wherein each of the single materials has:
  a bearing part having a shaft hole formed at a center;
  a ring-shape rib formed at an outer periphery side of the bearing part at a distance;
  an outer edge ring formed at the outermost peripheral edge of each of the single materials;
  partition walls formed radially at equal angle intervals from the bearing part through the ring-shape rib until the outer edge ring; and
  a magnet housing part assigned to a space surrounded by the partition walls, the ring-shape rib and the outer edge ring, and
wherein the magnet housing part of each of the single materials are aligned in the laminated single materials such that the magnet housing parts form the magnet housing.

2. The motor rotor support according to claim 1, wherein the single material is a cold-worked material and has a relative permeability of less than 1.005 and a 0.2% yield strength at room temperature of 600 MPa or more.

3. The motor rotor support according to claim 1, wherein the nonmagnetic steel is an 18Mn-18Cr nonmagnetic steel.

4. The motor rotor support according to claim 1, wherein a rare-earth magnet or a non-rare-earth magnet is included as the magnetic body.

5. The motor rotor support according to claim 4, wherein the non-rare-earth magnet is a ferrite magnet.

6. The motor rotor support according to claim 1, wherein a dust core is included as the magnetic body.

7. The motor rotor support according to claim 1, having a lamination structure in which the single materials are bound.

8. The motor rotor support according to claim 7, wherein the binding is any one of caulking, screwing, welding, adhering, and outer periphery shrink-fitting with a ring material or a combination thereof.

9. The motor rotor support according to claim 1,
wherein the ring-shape rib has a through hole between an inner peripheral side of the magnet housing part and the outer peripheral side of the bearing part, and
wherein the magnet housing part and the through hole are located on a same radial line extending from the center of the shaft hole.

10. A method for manufacturing a motor rotor support for supporting a magnetic body disposed on a rotor of a motor, the method comprising:
subjecting a nonmagnetic steel to hot working to obtain a hot-worked material;
subjecting the hot-worked material to machining to obtain a support single material having a relative permeability of less than 1.005 and a 0.2% yield strength at room temperature of 550 MPa or more, wherein the support single material is one of a plurality of support single materials;
configuring each of the plurality of support single materials as a disk shape, wherein each of the plurality of support single materials has: a bearing part having a shaft hole formed at a center; a ring-shape rib formed at an outer periphery side of the bearing part at a distance; an outer edge ring formed at the outermost peripheral edge of each of the plurality of single support materials; partition walls formed radially at equal angle intervals from the bearing part through the ring-shape rib until the outer edge ring; and a magnet housing part assigned to a space surrounded by the partition walls, the ring-shape rib and the outer edge ring;
aligning the magnet housing part of each of the plurality of support single materials such that the magnet housing parts form a magnet housing in which the magnetic body is disposed, such that all of the plurality of support single materials support the magnetic body disposed therein; and
laminating and binding the aligned plurality of support single materials.

11. The method for manufacturing a motor rotor support according to claim 10, wherein a solid solution treatment at 1,000° C. or more for 5 minutes or more is performed after the hot working and thereafter an aging treatment at 600 to 1,000° C. for 0.5 hours or more is performed.

12. The method for manufacturing a motor rotor support according to claim 10, wherein the machining comprises any one or more steps of carving, cold punching, cutting, laser processing, electric discharge machining, deep drawing, and welding.

13. The method for manufacturing a motor rotor support according to claim 10, wherein the nonmagnetic steel is an 18Mn-18Cr nonmagnetic steel.

14. The method for manufacturing a motor rotor support according to claim 10, wherein the binding is performed by any one of caulking, screwing, welding, adhering, and outer periphery shrink-fitting with a ring material or a combination thereof.

15. A method for manufacturing a motor rotor support for supporting a magnetic body disposed on a rotor of a motor, the method comprising:
subjecting a nonmagnetic steel to hot working and subsequently to cold working to obtain a cold-worked material;
subjecting the cold-worked material to machining to obtain a support single material having a relative permeability of less than 1.005 and a 0.2% yield strength at room temperature of 600 MPa or more, wherein the support single material is one of a plurality of support single materials;
configuring each of the plurality of support single materials as a disk shape, wherein each of the plurality of support single materials has: a bearing part having a shaft hole formed at a center; a ring-shape rib formed at an outer periphery side of the bearing part at a distance; an outer edge ring formed at the outermost peripheral edge of each of the plurality of single support materials; partition walls formed radially at equal angle intervals from the bearing part through the ring-shape rib until the outer edge ring; and a magnet housing part assigned to a space surrounded by the partition walls, the ring-shape rib and the outer edge ring;
aligning the magnet housing part of each of the plurality of support single materials such that the magnet housing parts form a magnet housing in which the magnetic body is disposed, such that all of the plurality of support single materials support the magnetic body disposed therein; and
laminating and binding the aligned plurality of support single materials.

16. The method for manufacturing a motor rotor support according to claim 15, wherein the cold working comprises a cold rolling step.

17. The method for manufacturing a motor rotor support according to claim 15, wherein the cold work rate of the cold working is from 5 to 40%.

18. The method for manufacturing a motor rotor support according to claim 15, wherein the machining comprises any one or more steps of carving, cold punching, cutting, laser processing, electric discharge machining, deep drawing, and welding.

19. The method for manufacturing a motor rotor support according to claim 15, wherein the nonmagnetic steel is an 18Mn-18Cr nonmagnetic steel.

20. The method for manufacturing a motor rotor support according to claim 15, wherein the binding is performed by any one of caulking, screwing, welding, adhering, and outer periphery shrink-fitting with a ring material or a combination thereof.

* * * * *